United States Patent
Song

(10) Patent No.: US 10,033,921 B2
(45) Date of Patent: Jul. 24, 2018

(54) METHOD FOR SETTING FOCUS AND ELECTRONIC DEVICE THEREOF

(71) Applicant: Samsung Electronics Co., Ltd, Gyeonggi-do (KR)

(72) Inventor: Wonseok Song, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/331,772

(22) Filed: Oct. 21, 2016

(65) Prior Publication Data

US 2017/0118404 A1   Apr. 27, 2017

(30) Foreign Application Priority Data

Oct. 21, 2015  (KR) .................. 10-2015-0146680

(51) Int. Cl.
*H04N 5/232*   (2006.01)

(52) U.S. Cl.
CPC ..... *H04N 5/23219* (2013.01); *H04N 5/23212* (2013.01)

(58) Field of Classification Search
CPC .................. H04N 5/23219; H04N 5/23212
See application file for complete search history.

(56) References Cited

U.S. PATENT DOCUMENTS

| | | | |
|---|---|---|---|
| 8,195,042 B2 | 6/2012 | Kimoto | |
| 8,922,705 B2* | 12/2014 | Lee | H04N 5/23219 348/208.14 |
| 9,521,310 B2* | 12/2016 | Lee | H04N 5/23219 |
| 2005/0264758 A1* | 12/2005 | Wakamori | A61B 5/1171 351/206 |
| 2008/0278587 A1* | 11/2008 | Izawa | G02B 7/36 348/207.11 |
| 2011/0115967 A1* | 5/2011 | Lee | H04N 5/23212 348/349 |
| 2012/0057028 A1 | 3/2012 | Tanaka | |
| 2012/0147252 A1* | 6/2012 | Kunishige | H04N 5/23212 348/345 |
| 2014/0043522 A1* | 2/2014 | Hamano | H04N 5/23212 348/349 |
| 2014/0104483 A1* | 4/2014 | Kunishige | H04N 5/23212 348/349 |
| 2014/0168479 A1* | 6/2014 | Ishii | H04N 5/23212 348/241 |
| 2017/0289441 A1* | 10/2017 | Zhang | H04N 5/23212 |

FOREIGN PATENT DOCUMENTS

JP   2012-058464   3/2012
JP   2013-195577   9/2013

* cited by examiner

*Primary Examiner* — Shahbaz Nazrul

(57) ABSTRACT

Various embodiments of the present disclosure provide a method and apparatus for dynamically determining an auto focusing (AF) area according to a size information of a face in a digital image processing device. An embodiment of the disclosure provides a digital image processing device including a camera and a processor configured to detect a face area in a preview image obtained by the camera, obtain a size of the face area, determine a focus area based on the size of the face area, and set focus based on the focus area.

16 Claims, 19 Drawing Sheets

METHOD FOR SETTING FOCUS AND ELECTRONIC DEVICE THEREOF

CROSS-REFERENCE TO RELATED APPLICATION(S) AND CLAIM OF PRIORITY

The present application is related to and claims priority under 35 U.S.C. § 119 to Korean Application Serial No. 10-2015-0146680, which was filed in the Korean Intellectual Property Office on Oct. 21, 2015, the entire content of which is incorporated herein by reference.

TECHNICAL FIELD

Various embodiments of the present disclosure relate to a method and an apparatus for setting focus in a digital image processing device; and more particularly, to a method and an apparatus for performing an auto focusing function in a digital image processing device.

BACKGROUND

As communication technology is developing, digital image processing devices (for example, smart phones, tablet PCs, smart cameras, digital cameras, or the like) are used in various fields due to their use convenience and portability.

The digital image processing device may include a function for satisfying consumers' needs to easily take photos and videos of high quality and high pixel. For example, the digital image processing device provides an Auto Focusing (AF) function to automatically set focus of a subject without requiring a user's specific operation.

In general, when the digital image processing device takes portraits, the AF function provided by the digital image processing device may automatically set focus based on a face area of a subject which is detected through a Face Detection (FD) function. However, when focus is set based on the face area of the subject, the accuracy of the AF of the digital image processing device may be reduced since the face area of the subject does not have many high frequency components. For example, when the face area of the subject detected through the FD function includes a background as well as the subject's face, back-focusing may occur in the digital image processing device due to high frequency information existing in the background. In another example, back-focusing may occur in the digital image processing device due to face shape information of the subject included in the face area of the subject.

SUMMARY

To address the above-discussed deficiencies, it is a primary object to provide a method and an apparatus for dynamically determining an AF area according to size information of a face in a digital image processing device.

According to an embodiment of the present disclosure, a digital image processing device includes a camera and a processor configured to detect a face area in a preview image obtained by the camera, obtain a size of the face area determine a focus area based on the size of the face area, and set a focus based on the focus area.

According to another embodiment of the present disclosure, a method for processing a digital image includes detecting a face area in a preview image, obtaining a size of the face area from the preview image, determining a focus area based on the size of the face area, and setting focus based on the focus area.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
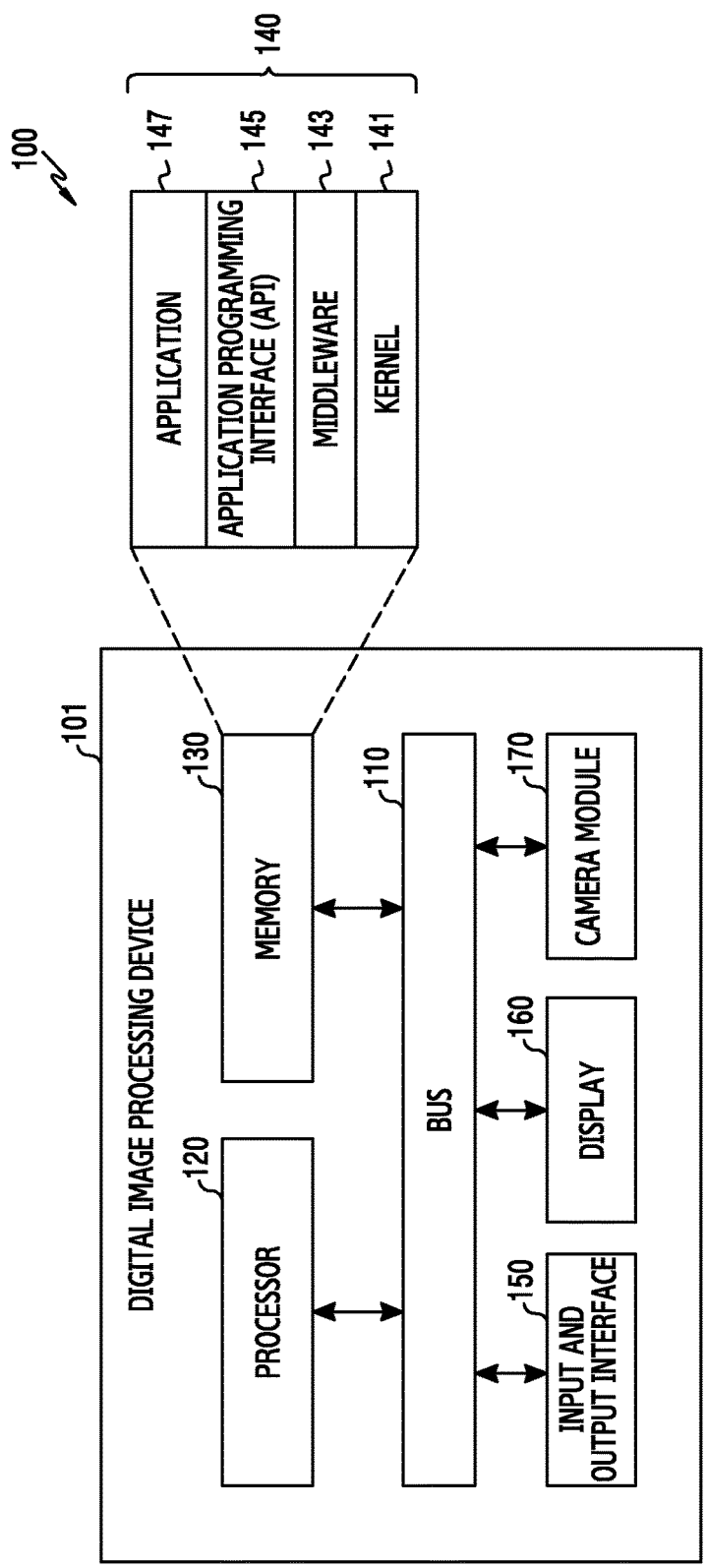
FIG. 1 illustrates a network environment including a digital image processing device according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device having a camera.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some instances, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple® TV, or Google® TV), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship, (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including a digital image processing device according to various embodiments of the present disclosure.

Referring to FIG. 1, the digital image processing device 101 may include a bus 110, a processor 120, a memory 130, an input and output interface 150, a display 160, and a camera module 170. In a certain embodiment, the digital image processing device 101 may omit at least one of the elements or may additionally include other elements.

The bus 101 may include a circuit which connects the elements 120-170 with one another and delivers communication (for example, a control message and/or data) between the elements.

The processor 120 may include one or more of a Central Processing Unit (CPU), an Application Processor (AP), and an Image Signal Processor (ISP). The processor 120 may perform calculation or data processing related to control and/or communication of at least one other element of the digital image processing device 101.

According to an embodiment of the present disclosure, the processor 120 may process an image which is obtained through the camera module 170. For example, the processor 120 may convert an optical signal which is obtained through the camera module 170 into an electric signal. The processor 120 may perform image processing (for example, scaling, noise removal, RGB signal conversion, or the like) with respect to corresponding image data, such that the image data obtained through the camera module 170 is displayed on the display 160. For example, when the processor 120 detects an input for executing the camera module 170, the processor 120 may control to activate the camera module 170. The processor 120 may control the display 160 to display a preview image which is obtained through the camera module 170.

According to an embodiment of the present disclosure, the processor 120 may detect a size of a face area of a subject from the preview image. For example, the processor 120 may detect the face area of the subject from the preview image through a face detection function. For example, when a plurality of face areas are detected from the preview image, the processor 120 may set one of the plurality of face areas as a main face area based on a predetermined selection criterion. The predetermined selection criterion may include proximity information or size information of the face area of the subject to the center of the preview image.

According to an embodiment of the present disclosure, the processor 120 may determine a focus area based on the size of the face area of the subject. For example, when it is determined that the size of the face area (for example, the main face area) of the subject satisfies a first reference value, the processor 120 may determine an eye area of the subject as the focus area. In another example, when it is determined that the size of the face area of the subject does not satisfy the first reference value, the processor 120 may determine the face area of the subject as the focus area. For example, when the size of the face area of the subject is larger than a first reference size, the processor 120 may determine that the size of the face area satisfies the first reference value. For example, when a ratio between the size of the preview image and the size of the face area is higher than a first reference ratio, the processor 120 may determine that the size of the face area satisfies the first reference value. Herein, the first reference size and the first reference ratio may be pre-set values and may be changed by a user.

According to an embodiment of the present disclosure, the processor 120 may set focus for photographing based on the focus area. For example, when it is determined that the size of the face area of the subject satisfies the first reference value, the processor 120 may set focus based on the eye area of the subject. In another example, when it is determined that the size of the face area of the subject does not satisfy the first reference value, the processor 120 may set focus based on the face area of the subject. For example, the processor 120 may set focus based on area information of eye, nose, and lip included in the face area of the subject.

According to an embodiment of the present disclosure, the processor 120 may determine the size of the eye area of the subject to set focus. For example, when it is determined that the size of the eye area of the subject does not satisfy a second reference value, the processor 120 may magnify the eye area of the subject to include eyebrows of the subject. The processor 120 may set focus based on the magnified eye area of the subject. For example, when the size of the eye area of the subject is smaller than a second reference size, the processor 120 may determine that the size of the eye area of the subject does not satisfy the second reference value. For example, when a ratio between the size of the preview image and the size of the eye area is lower than a second reference ratio, the processor 120 may determine that the size of the eye area does not satisfy the second reference value. Herein, the second reference size and the second reference ratio may be pre-set values and may be changed by the user.

The memory 130 may include a volatile memory and/or a non-volatile memory. For example, the memory 130 may store commands or data related to at least one other element of the digital image processing device 101. According to an embodiment of the present disclosure, the memory 130 may store software and/or a program 140. The program 140 may include a kernel 141, middleware 143, an Application Programming Interface (API) 145, and/or an application program (or an application) 147, or the like. At least some of the kernel 141, the middleware 143, or the API 145 may be referred to as an Operating System (OS).

For example, the kernel 141 may control or manage system resources (for example, the bus 110, the processor 120, the memory 130, or the like) which are used for performing operations or functions implemented in the other programs (for example, the middleware 143, the API 145, or the application program 147). In addition, the kernel 141 may provide an interface for allowing the middleware 143, the API 145, or the application program 147 to access an individual element of the digital image processing device 101 and control or manage the system resources.

For example, the middleware 143 may serve as an intermediary to allow the API 145 or the application program 147 to communicate with the kernel 141 and exchange data with the kernel 141.

In addition, the middleware 143 may process one or more work requests received from the application program 147 according to priority. For example, the middleware 143 may give priority to use the system resources (for example, the bus 110, the processor 120, the memory 130, or the like) of the digital image processing device 101 to at least one of the application programs 147. For example, the middleware 143 may perform scheduling or load balancing with respect to the one or more work requests by processing the one or more work requests according to the priority given to the at least one application program.

For example, the API 145 may be an interface for allowing the application 147 to control a function provided by the kernel 141 or the middleware 143, and, for example, may include at least one interface or function (for example, instructions) for controlling a file, controlling a window, processing an image, or controlling a text.

For example, the input and output interface 150 may serve as an interface for transmitting instructions or data inputted by the user or another external device to other element(s) of the digital image processing device 101. In addition, the input and output interface 150 may output instructions or data received from other element(s) of the digital image processing device 101 to the user or another external device.

For example, the display 160 may include a Liquid Crystal Display (LCD), a Light Emitting Diode (LED) display, an Organic LED (OLED) display, a Micro Electro Mechanical System (MEMS) display, or an electronic paper display. For example, the display 160 may display various contents (for example, a text, an image, a video, an icon, a symbol or the like) for the user. The display 160 may include a touch screen, and for example, may receive a touch, a gesture, an approach, or a hovering input inputted using an electronic pen or a user's body.

The camera module 170 performs a function of collecting an image by photographing a subject. The camera module 170 may be activated according to a signal which is generated in the input and output interface 150 or the display 160 (for example, the touch screen), and may collect an image. For example, the camera module 170 includes an image sensor. For example, the image sensor may include a Charge-Coupled Device (CCD) sensor, a Complementary Metal-Oxide Semiconductor (CMOS) sensor, or the like. The camera module 170 may include a first camera (for example, a front camera) to photograph in a selfie mode, and a second camera (for example, a rear camera) to photograph a subject located in front of the user. For example, the camera module 170 may further include at least one of an image signal processor (ISP) to convert an optical signal obtained through the image sensor into an electric signal, and a digital signal processor to perform image processing (scaling, noise removal, RGB signal conversion, or the like) with respect to corresponding image data such that the image data outputted from the ISP is displayed on the display 160. In this instance, the camera module 170 may provide the image collected under the control of the controller 120 to the display 160.

Although not shown, the digital image processing device 101 may include a communication interface, for example. For example, the communication interface may set communication between the digital image processing device 101 and an external device or between the digital image processing device 101 and a server. For example, the communication interface may be connected to a network through wireless communication or wire communication to communicate with the external device or the server. In this instance, the processor 120 may include a Communication Processor (CP).

The wireless communication may use, as a cellular communication protocol, at least one of Long Term Evolution (LTE), LTE-Advance, Code Division Multiple Access (CDMA), Wideband CDMA (WCDMA), Universal Mobile Telecommunications System (UMTS), Wireless Broadband (WiBro), or Global System for Mobile Communications (GSM). In addition, for example, the wireless communication may include short-distance communication. The short-distance communication may include at least one of Wireless Fidelity (WiFi), Bluetooth®, Bluetooth® Low Energy (BLE), Near Field Communication (NFC), a Global Navigation Satellite System (GNSS), or the like. The GNSS may include at least one of a Global Positioning System (GPS), a Global Navigation Satellite System (Glonass®), a Beidou® Navigation Satellite System (Beidou®), Galileo®, or the European Global Satellite-based Navigation System according to a user region or a bandwidth. Hereinafter, "GPS" may be interchangeably used with "GNSS." For example, the wire communication may include at least one of a Universal Serial Bus (USB), a High Definition Multimedia Interface (HDMI), recommended standard 232 (RS-232), or Plain Old Telephone Service (POTS). The network may include a telecommunications network, for example, at least one of a computer network (for example, a Local Area Network (LAN) or a Wide Area Network (WAN)), Internet, a telephone network, or the like.

The external device and the server may be the same or different kind of device as or from the digital image processing device 101. According to an embodiment of the present disclosure, the server may include a group of one or more servers. According to various embodiments of the present disclosure, an entirety or part of operations performed in the digital image processing device 101 may be performed in another external electronic device or server, or a plurality of external electronic device or servers. According to an embodiment of the present disclosure, when the digital image processing device 101 should perform a certain function or service automatically or according to a request, the digital image processing device 101 may request the external electronic device or the server to perform at least some of the related functions additionally or instead of performing the function or the service by itself. The external electronic device or the server may perform the requested function or additional function and may deliver the result thereof to the digital image processing device 101. The digital image processing device 101 may process the received result as it is or additionally and provide the requested function or service. To achieve this, technologies of cloud computing, distributed computing, or client-server computing may be used.

According to various embodiments of the present disclosure, the digital image processing device 101 may determine a focus area based on a size of a face area through a separate control module which is distinguished from the processor 120.

Figure 2:
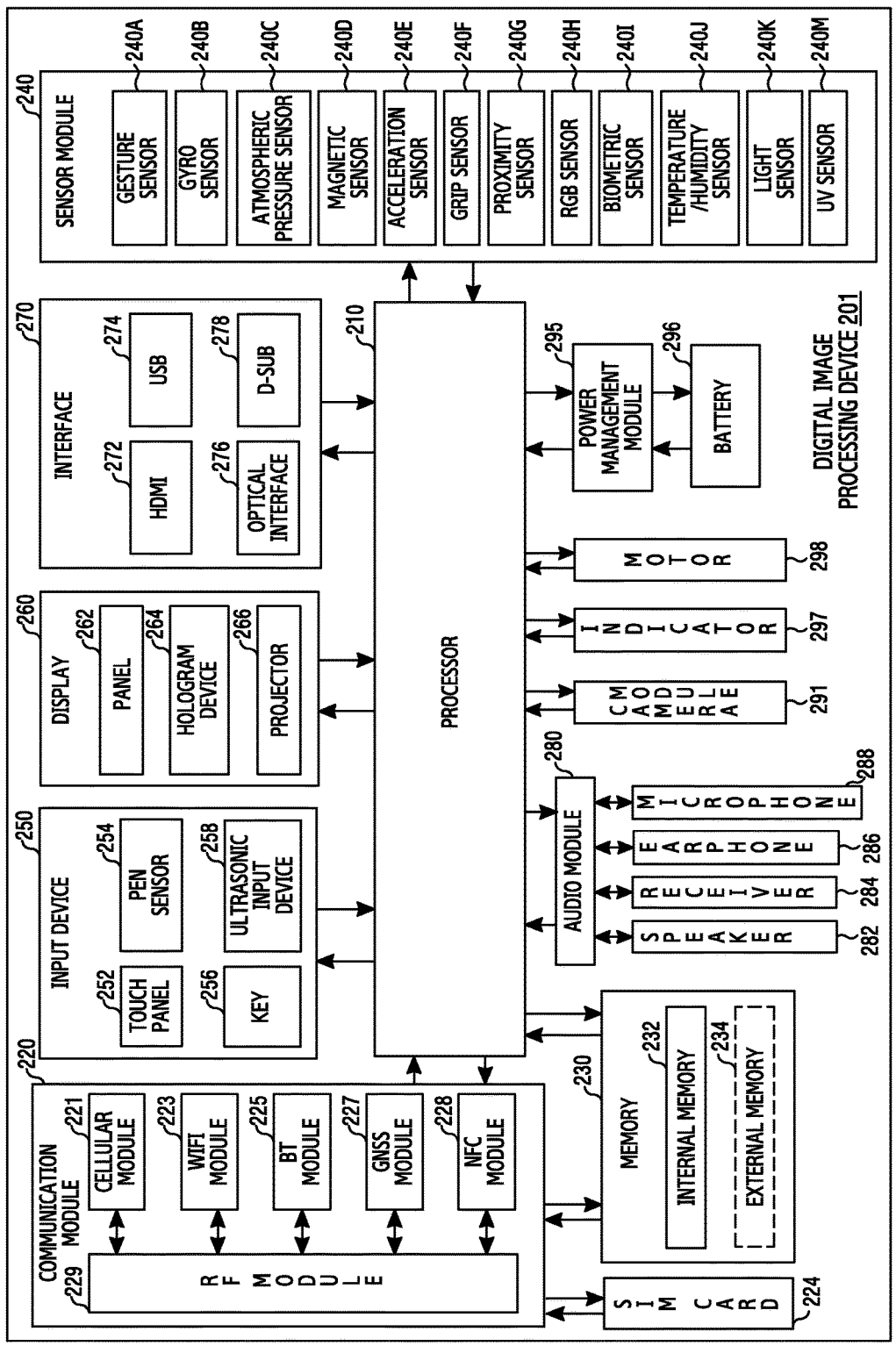
FIG. 2 is a block diagram that illustrates a digital image processing device according to various embodiments of the present disclosure.

FIG. 2 is a block diagram that illustrates a digital image processing device according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass® module, a Beidou® module, or a Galileo® module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad.

The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO®.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
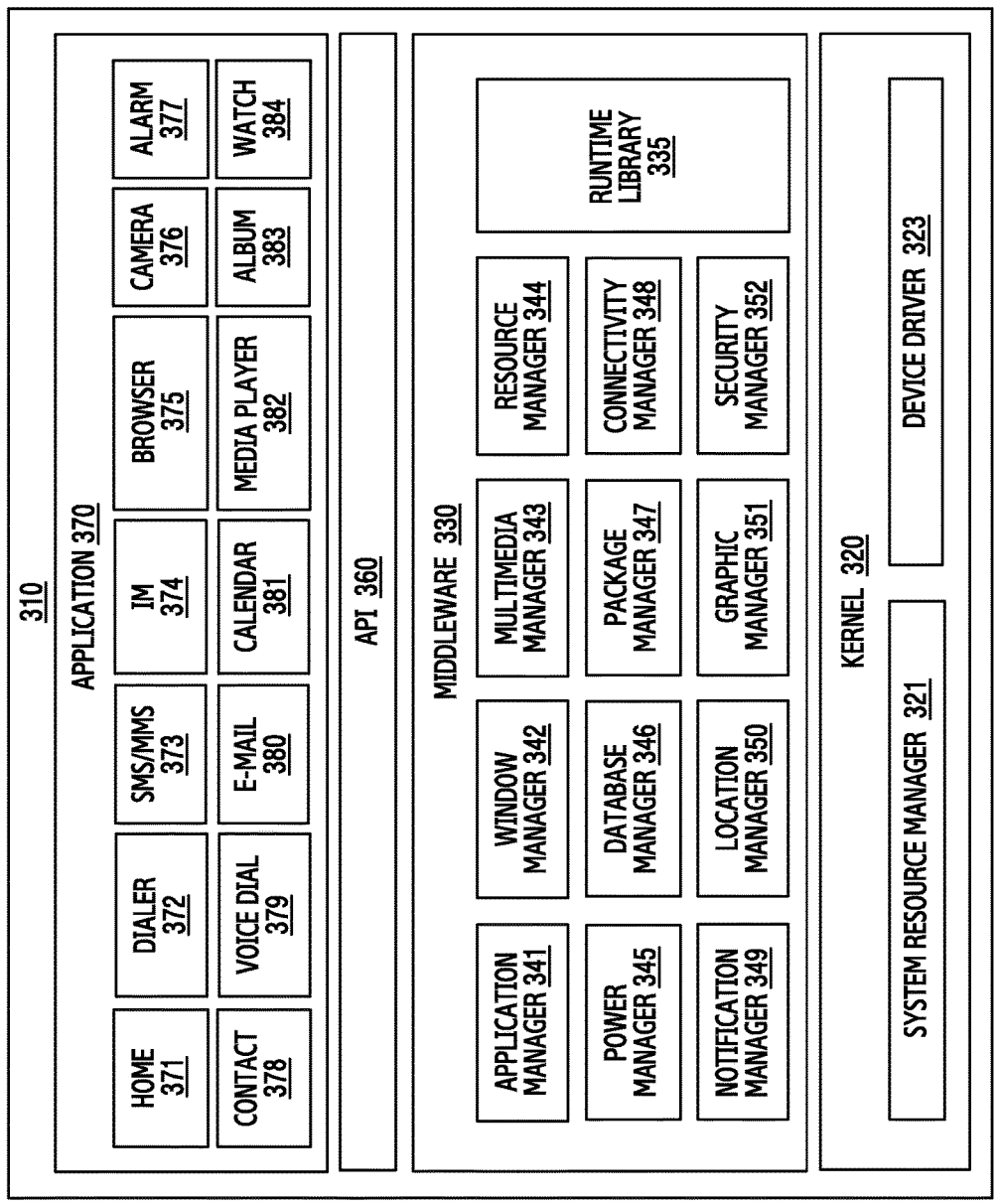
FIG. 3 is a block diagram that illustrates a program module according to various embodiments of the present disclosure.

FIG. 3 is a block diagram that illustrates a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android®, iOS®, Windows®, Symbian®, Tizen®, Bada®, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth® driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth®. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the operating systems of Android® or iOS®, one API set may be provided for each platform. In the operating system, for example, of Tizen®, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

Figure 4:
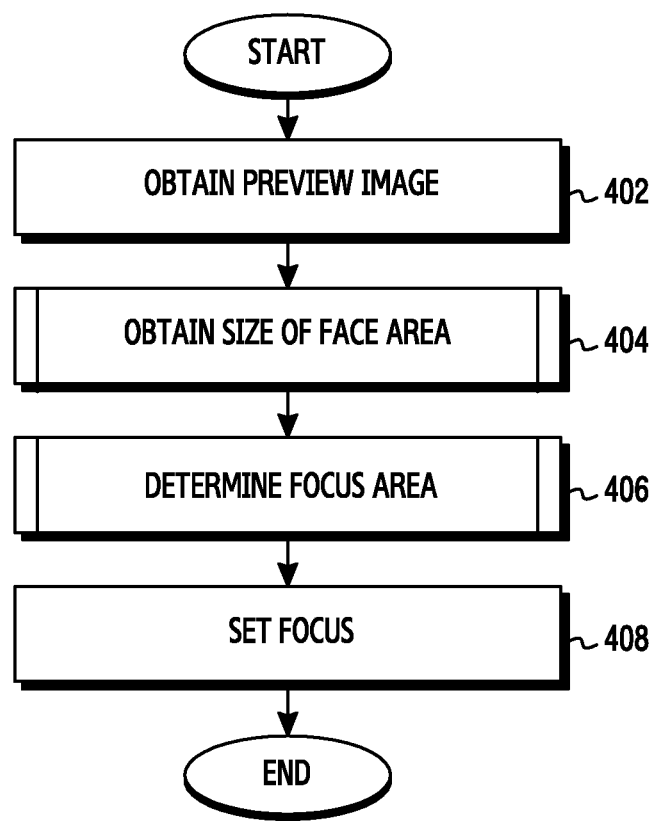
FIG. 4 is a flowchart that illustrates a method of auto focusing in a digital image processing device according to various embodiments of the present disclosure.

FIG. 4 is a flowchart that illustrates a method of auto focusing in a digital image processing device according to various embodiments of the present disclosure.

Referring to FIG. 4, in operation 402, the digital image processing device (for example, the digital image processing device 102 or 201) may obtain a preview image through a camera (for example, the camera module 170 or 291). For example, when an input to activate the camera module 170 is detected through the input and output interface 150 or the display 160 (for example, the touch screen), the processor 120 may control to activate the camera module 170. The processor 120 may control the display 160 to display the preview image which is obtained through the activated camera module 170.

In operation 404, the digital image processing device may obtain a size of a face area of a subject. For example, the processor 120 may detect the face area of the subject from the preview image through a face detection function. The processor 120 may obtain the size of the face area of the subject. For example, when a plurality of face areas are detected, the processor 120 may set one of the plurality of face areas as a main face area based on a predetermined selection criterion. The processor 120 may obtain the size of the main face area. Herein, the main face area may be set based on proximity information or size information to the center of the preview image. For example, the main face area may be a face area which is located nearest to the center of the preview image. In another example, the main face area may be the largest face area.

In operation 406, the digital image processing device may determine a focus area using the size of the face area (for example, the main face area) of the subject. For example, when it is determined that the size of the face area of the subject satisfies a first reference value, the processor 120 may determine an eye area of the subject as the focus area. In another example, when it is determined that the size of the face area of the subject does not satisfy the first reference value, the processor 120 may determine the face area of the subject as the focus area. For example, when it is determined that the size of the face area of the subject is larger than a first reference size or a ratio between the size of the preview image and the size of the face area of the subject is higher than a first reference ratio, the processor 120 may determine that the face area of the subject satisfies the first reference value. Herein, the first reference size and the first reference value may be pre-set values and may be set and changed based on information which is inputted through at least one of the input and output interface 150 or the display 160 (for example, the touch screen).

In operation 408, the digital image processing device may set focus based on the focus area. For example, when the eye area of the subject is determined as the focus area, the processor 120 may set focus based on the eye area of the subject. In another example, when the face area of the subject is determined as the focus area, the processor 120 may set focus based on the face area of the subject. For example, when the face area of the subject is determined as the focus area, the processor 120 may set focus based on area information of eye, noise, and lip.

Figure 5:
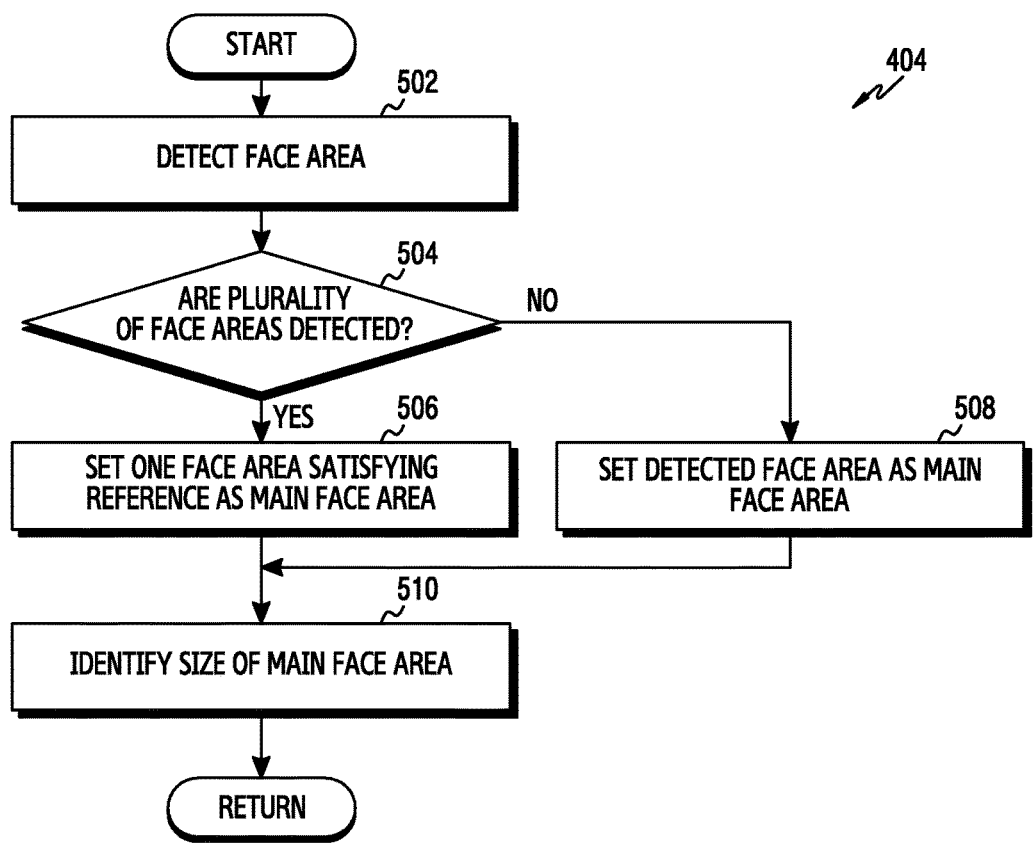
FIG. 5 is a flowchart that illustrates a method of identifying a size of a face area in a digital image processing device according to various embodiments of the present disclosure.

FIG. 5 is a flowchart that illustrates a method of identifying a size of a face area in a digital image processing device according to various embodiments of the present disclosure. Hereinafter, the operation of obtaining a size of a face area of a subject in operation 404 of FIG. 4 will be described with reference to screen configurations of FIGS. 6A and 6B.

Referring to FIG. 5, in operation 502, the digital image processing device (for example, the digital image processing device 101 or 201) may detect a face area of at least one subject from a preview image. For example, the processor 120 may detect a face area of at least one subject from the preview image which is obtained in operation 402 of FIG. 4 using the face detection function.

In operation 504, the digital image processing device may determine whether a plurality of face areas is detected from the preview image or not. For example, the processor 120 may whether the face area of the subject detected using the face detection function is plural in number or not.

Figure 6A:
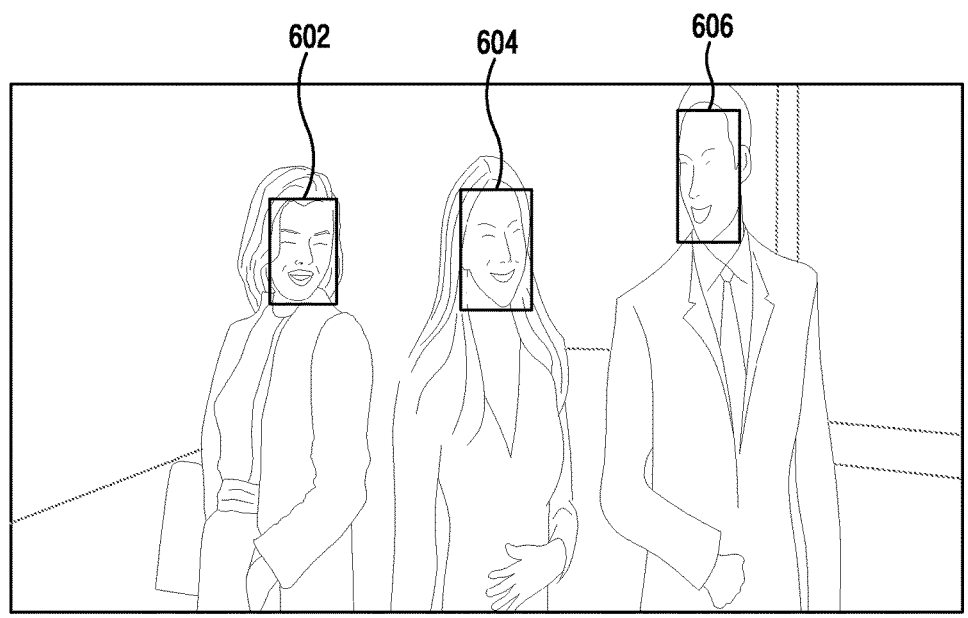
FIGS. 6A and 6B illustrate screen configurations from which face areas are detected in a digital image processing device according to various embodiments of the present disclosure.
Figure 6B:
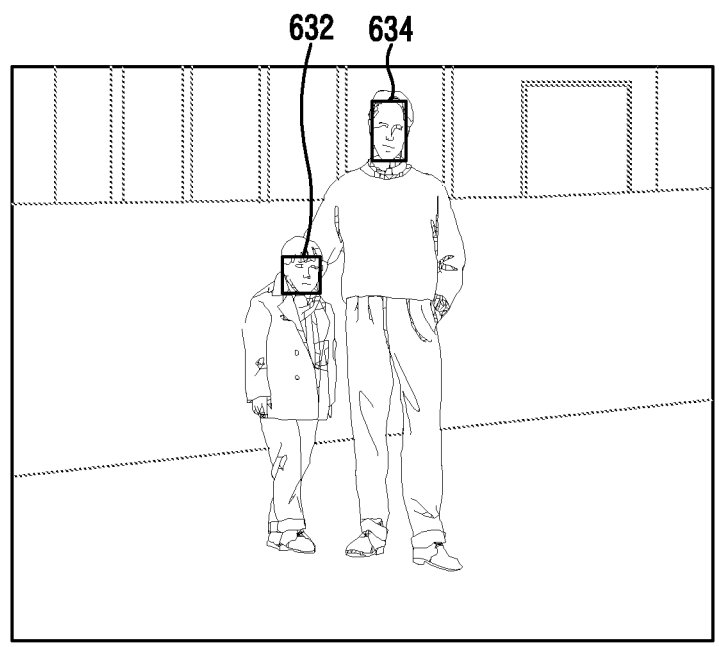

In operation 506, when the plurality of face areas are detected from the preview image, the digital image processing device may set one of the plurality of face areas that satisfies a criterion as a main face area. For example, when a first face area 602, a second face area 604, and a third face area 606 are detected from the preview image as shown in FIG. 6A, the processor 120 may set the second face area 604 which is located nearest to the center of the preview image as the main face area. In another example, when a fourth face area 632 and a fifth face area 634 are detected from the preview image as shown in FIG. 6B, the processor 120 may set the fifth face area 634 which has the largest size as the main face area.

In operation 508, when the single face area is detected from the preview image, the digital image processing device may set the face area as the main face area. For example, when the single face area is detected from the preview image through the face detection function, the processor 120 may set the face area detected from the preview image as the main face area.

In operation 510, the digital image processing device may identify the size of the main face area. For example, when the second face area 604 of FIG. 6A is set as the main face area, the processor 120 may identify the size of the second face area 604. In another example, when the fifth face area 634 of FIG. 6B is set as the main face area, the processor 120 may identify the size of the fifth face area 634.

According to various embodiments of the present disclosure, when the plurality of face areas are detected from the preview image, the digital image processing device may set the main face area using both proximity information and size information of the plurality of face areas to the preview image. For example, when the plurality of face areas are detected from the preview image, the processor 120 may identify distance information and size information of the plurality of face areas to the preview image. The processor 120 may set a certain face area as the main face area based on the distance information and the size information. For example, the processor 120 may give priority to one of the distance information and the size information, and may set the main face area. For example, the processor 120 may give a weight to one of the distance information and the size information, and may set the main face area.

Figure 7:
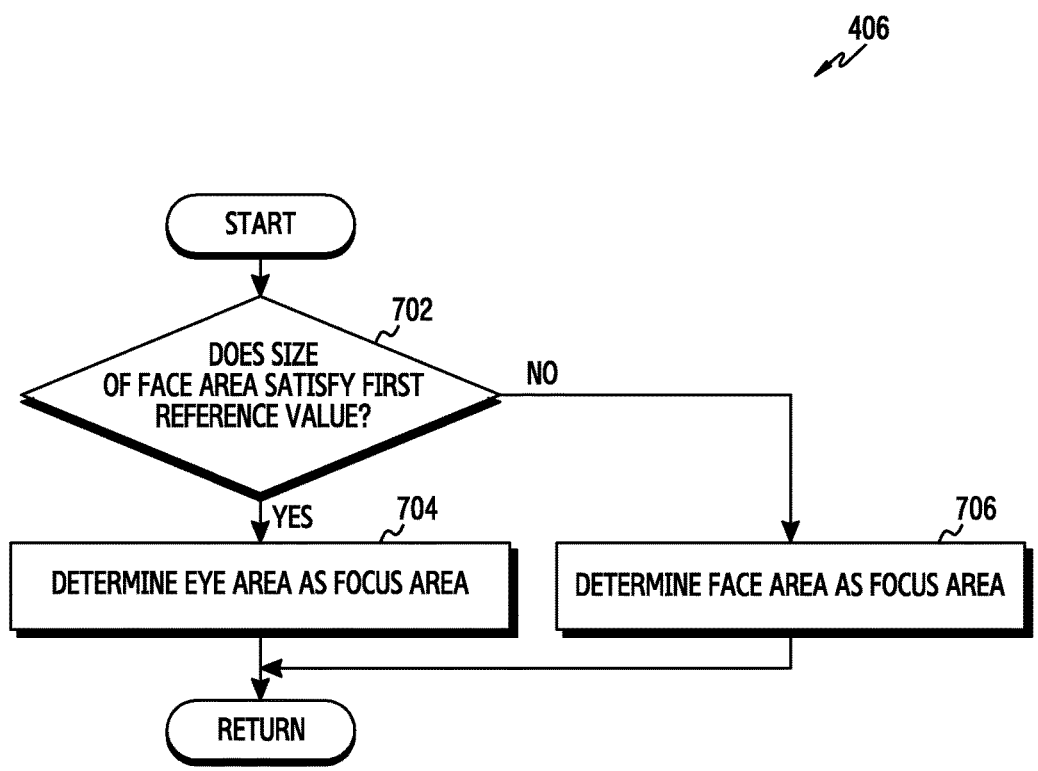
FIG. 7 is a flowchart that illustrates a method of determining a focus area in a digital image processing device according to various embodiments of the present disclosure.

FIG. 7 is a flowchart that illustrates a method of determining a focus area in a digital image processing device according to various embodiments of the present disclosure. The operation of determining a focus area for example, operation 406 shown in FIG. 4, will be further described below.

Referring to FIG. 7, in operation 702, the digital image processing device (for example, the digital image processing device 101 or 201) may determine whether a size of a face area of a subject satisfies a first reference value or not. For example, when the size of the face area of the subject is larger than a first reference size, the processor 120 may determine that the size of the face area of the subject satisfies the first reference value. In another example, when a ratio between the size of the preview image and the size of the face area of the subject is higher than a first reference ratio, the processor 120 may determine that the size of the face area of the subject satisfies the first reference value. Herein, the first reference size and the first reference ratio may be pre-set values, and may be set or changed by the user. For example, when an input to set or change the first reference size or the first reference ratio is detected through the input and output interface 150 or the display 160 (for example, the touch screen), the processor 120 may set or change the first reference size and the first reference ratio.

In operation 704, when it is determined that the size of the face area of the subject satisfies the first reference value, the digital image processing device may determine an eye area of the subject as a focus area. For example, when it is determined that the size of the face area of the subject satisfies the first reference value, the processor 120 may determine the eye area of the subject which is detected from the face area of the subject through an eye detection function as the focus area. In another example, the processor 120 may determine the eye area of the subject which is estimated from the face area of the subject through geometric modeling of the face as the focus area. In another example, the processor 120 may detect the eye area of the subject by performing the eye detection function with respect to the eye area of the subject which is estimated from the face area of the subject through the geometric modeling of the face.

According to an embodiment of the present disclosure, when the eye area of the subject is not detected through the eye detection function, the digital image processing device may estimate the eye area which is estimated from the face area of the subject through the geometric modeling of the face. For example, when the eye area is not detected from the face area of the subject because the subject closes eyes or wears sunglasses, the processor 120 may estimate the eye area of the subject from the face area of the subject through the geometric modeling of the face.

In operation 706, when it is determined that the size of the face area of the subject does not satisfy the first reference value, the digital image processing device may determine the face area of the subject as the focus area. For example, when it is determined that the size of the face area of the subject does not satisfy the first reference value, the processor 120 may detect an eye area, a nose area, and a lip area. The processor 120 may set focus based on area information of the eye, nose, and lip. For example, the processor 120 may individually detect the eye area, the nose area, and the lip area through respective detection functions. For example, the processor 120 may detect the eye area of the subject through the eye detection function and then may estimate the nose area and the lip area based on the detected eye area.

Figure 8:
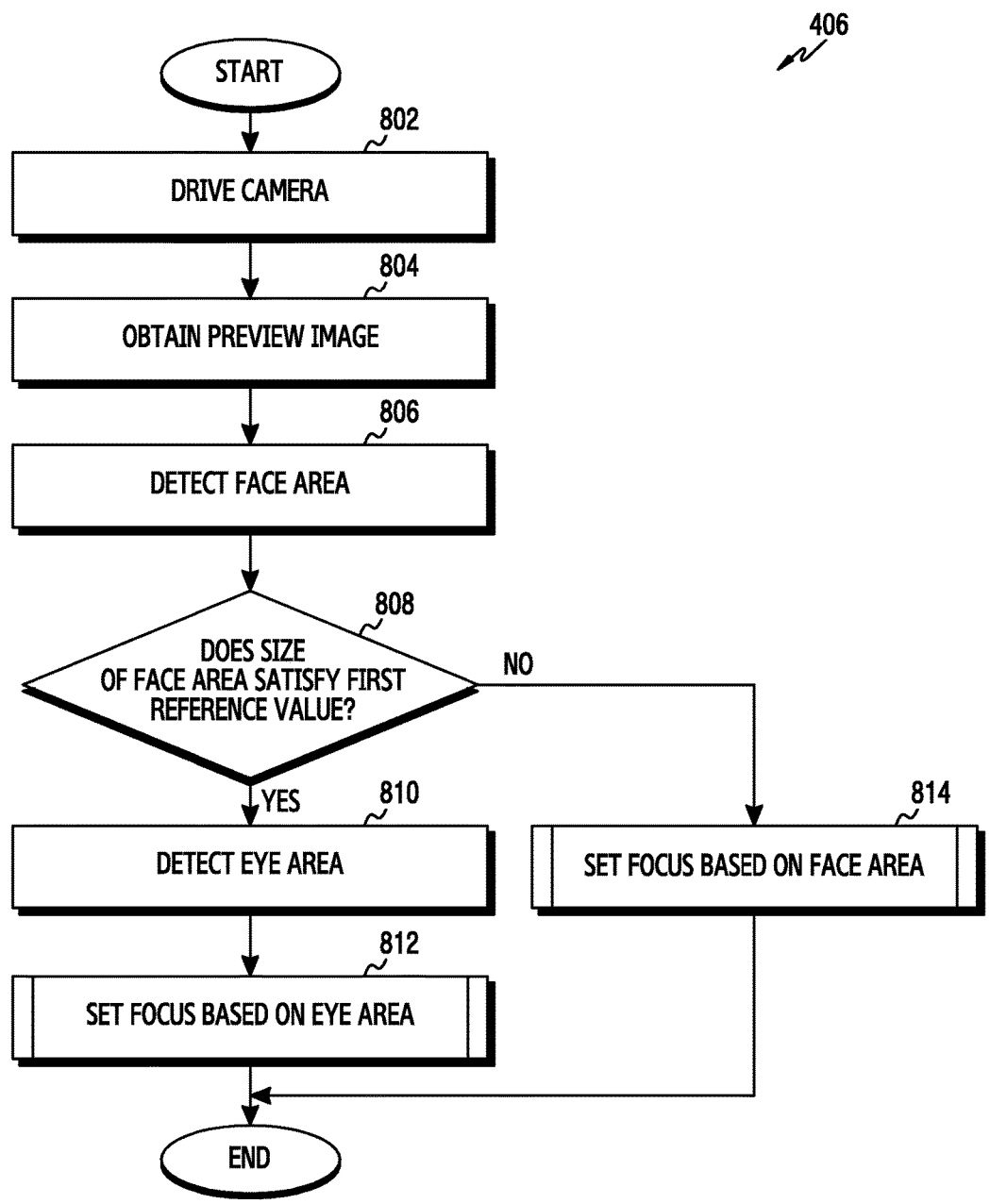
FIG. 8 is a flowchart that illustrates a method of auto focusing in a digital image processing device according to various embodiments of the present disclosure.
Figure 9A:
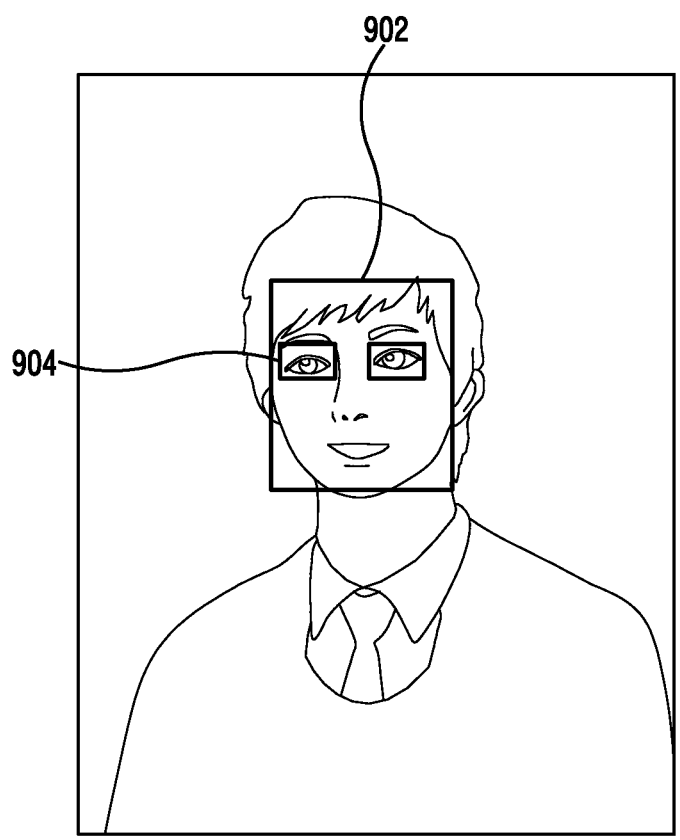
FIGS. 9A to 9C illustrate screen configurations for auto focusing in a digital image processing device according to various embodiments of the present disclosure.
Figure 9B:
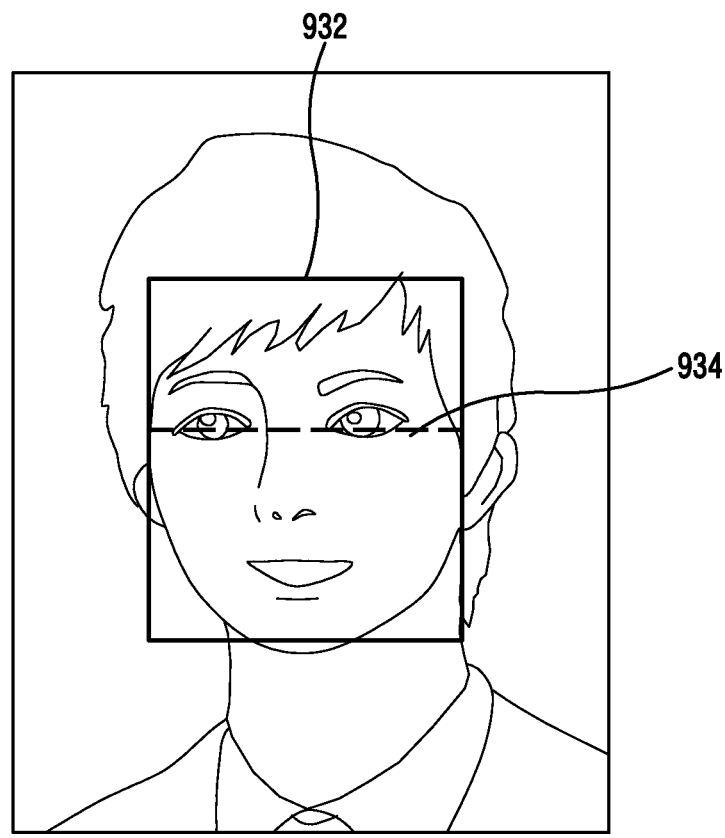

FIG. 8 is a flowchart that illustrates a method of auto focusing in a digital image processing device according to various embodiments of the present disclosure. The operation of auto focusing will be described with reference to screen configurations as shown in FIGS. 9A and 9B, for example, will be further described below.

Referring to FIG. 8, in operation 802, the digital image processing device (for example, the digital image processing device 101 or 201) may activate a camera (for example, the camera module 170 or 291). For example, when an input to activate the camera module 170 is detected through the input and output interface 150 or the display 160 (for example, the touch screen), the processor 120 may control to activate the camera module 170.

In operation 804, the digital image processing device may obtain a preview image through the camera. For example, the processor 120 may control to obtain the preview image through the camera module 170. For example, the processor 120 may control to output the preview image to the display 160.

In operation 806, the digital image processing device may detect a face area of a subject from the preview image. For example, the processor 120 may detect the face area of the subject from the preview image through the face detection function. For example, when a plurality of face areas are detected, the processor 120 may set a main face area based on proximity information of the face areas of the subjects to the center of the preview image. For example, when the plurality of face areas are detected, the processor 120 may set the main face area based on size information of the face areas of the subjects.

In operation 808, the digital image processing device may determine whether the size of the face area of the subject (for example, the main face area) satisfies a first reference value or not. For example, when the size of the face area of the subject is larger than a first reference size, the processor 120 may determine that the size of the face area of the subject satisfies the first reference value. In another example, when a ratio between the size of the preview image and the size of the face area is higher than a first reference ratio, the processor 120 may determine that the size of the face area of the subject satisfies the first reference value. For example, the processor 120 may set or change the first reference size and the first reference ratio based on input information of the input and output interface 150 or the display 160 (for example, the touch screen).

In operation 810, when it is determined that the size of the face area of the subject satisfies the first reference value, the digital image processing device may detect an eye area of the subject. For example, when a face area 902 satisfying the first reference value is detected as shown in FIG. 9A, the processor 120 may detect an eye area 904 of the subject through the eye detection function. In another example, when a face area 932 satisfying the first reference value is detected as shown in FIG. 9B, the processor 120 may estimate an eye area 934 through the geometric modeling of the face.

In operation 812, the digital image processing device may set focus based on the eye area. For example, the processor 120 may set focus based on the eye area 904 of the subject as shown in FIG. 9A. In another example, the processor 120 may set focus based on the estimated eye area 934 of the subject as shown in FIG. 9B.

Figure 9C:
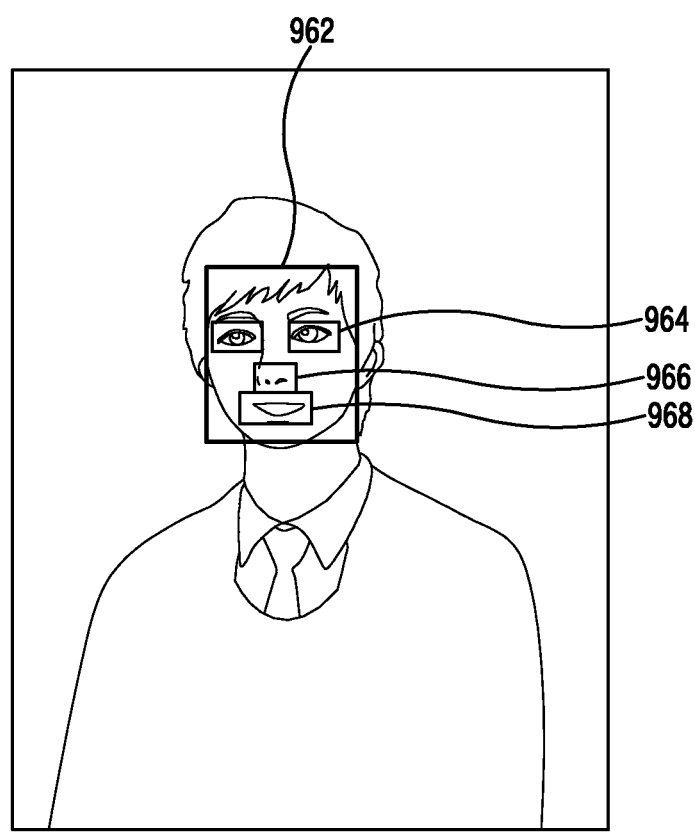

In operation 814, when it is determined that the size of the face area of the subject does not satisfy the first reference value, the digital image processing device may set focus based on the face area. For example, when a face area 962 which does not satisfy the first reference value is detected as shown in FIG. 9C, the processor 120 may detect an eye area 964, a nose area 966, and a lip area 968 from the face area 962 of the subject. The processor 120 may set focus based on the eye area 964, the nose area 966, and the lip area 968. For example, the processor 120 may detect the eye area 964, the nose area 966, and the lip area 968 from the face area 962 of the subject through respective detection functions. For example, the processor 120 may estimate the nose area 966 and the lip area 968 based on the eye area 964 of the subject which is detected through the eye detection function.

According to various embodiments of the present disclosure, the digital image processing device may perform the eye detection function with respect to the eye area which is estimated through the geometric modeling of the face. For example, the processor 120 may detect the eye area of the subject by performing the eye detection function with respect to only the eye area 934 which is estimated through the geometric modeling of the face.

Figure 10:
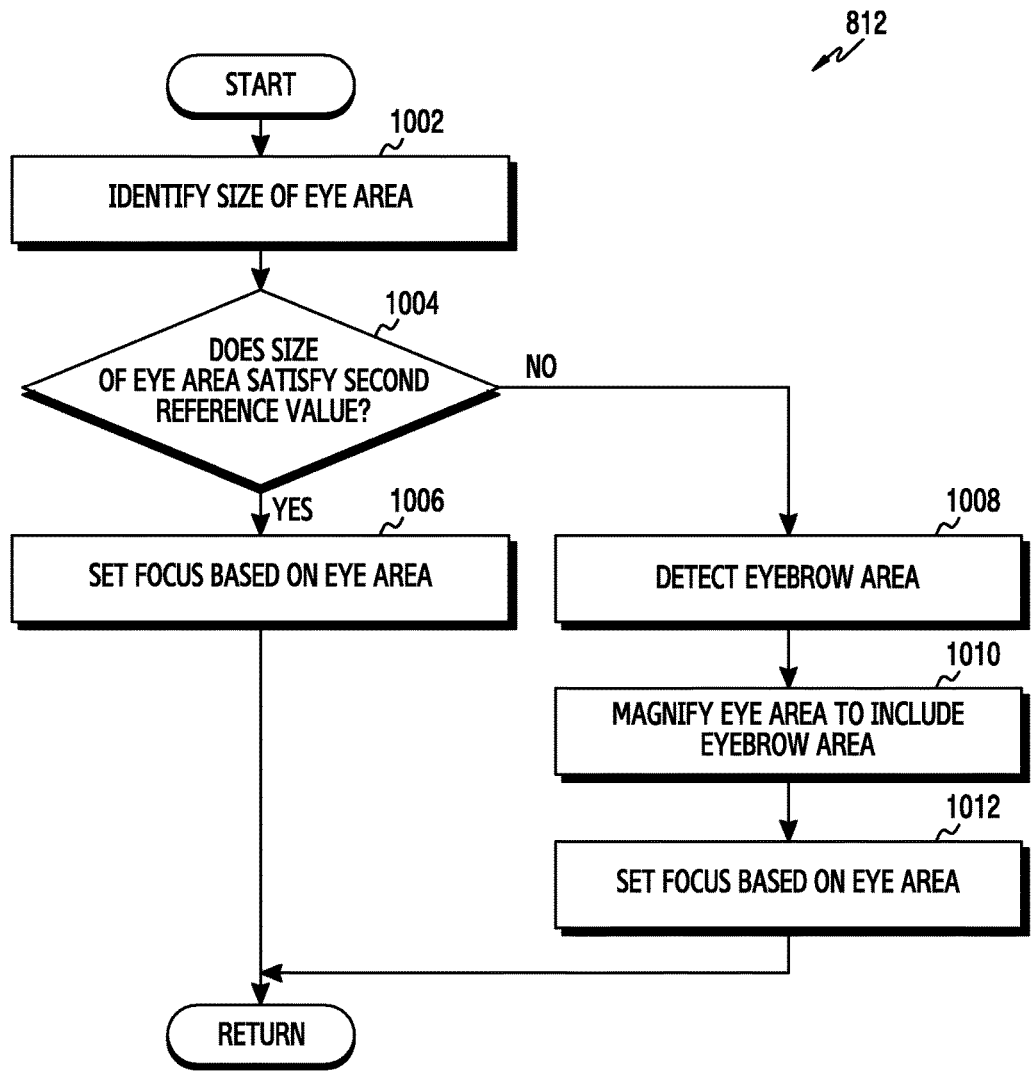
FIG. 10 is a flowchart that illustrates a method of setting focus on an eye area in a digital image processing device according to various embodiments of the present disclosure.

FIG. 10 is a flowchart that illustrates a method of setting focus on an eye area in a digital image processing device according to various embodiments of the present disclosure. The operation of setting focus based on an eye area, for example, in operation 812 of FIG. 8, will be further described below with reference to a screen configuration of FIG. 11.

Figure 11:
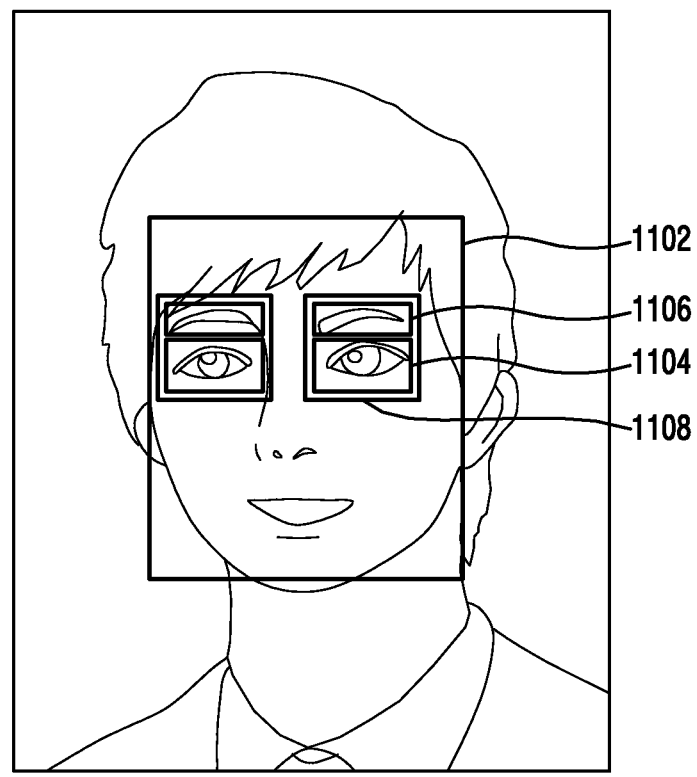
FIG. 11 illustrates a screen configuration for setting focus on an eye area in a digital image processing device according to various embodiments of the present disclosure.

Referring to FIG. 10, in operation 1002, the digital image processing device (for example, the digital image processing device 101 or 201) may identify a size of an eye area of a subject. For example, the processor 120 may identify the size of an eye area 1104 of a subject which is detected from a face area 1102 of the subject through the eye detection function as shown in FIG. 11.

In operation 1004, the digital image processing device may determine whether the size of the eye area of the subject satisfies a second reference value or not. For example, when the size of the eye area 1104 of the subject shown in FIG. 11 is larger than a second reference size, the processor 120 may determine that the size of the eye area satisfies the second reference value. In another example, when a ratio between the size of the face area 1102 of the subject shown in FIG. 11 and the size of the eye area 1104 of the subject is higher than a second reference ratio, the processor 120 may determine that the size of the eye area satisfies the second reference value. For example, the processor 120 may set or change the second reference size or the second reference ratio based on an input which is detected through at least one of the input and output interface 150 or the display 160 (for example, the touch screen).

In operation 1006, when the size of the eye area of the subject satisfies the second reference value, the digital image processing device may set focus based on the eye area of the subject. For example, when the size of the eye area 1104 of the subject shown in FIG. 11 is larger than the second reference size, the processor 120 may set focus based on the eye area 1104 of the subject. In another example, when the ratio between the size of the face area 1102 shown in FIG. 11 and the size of the eye area 1104 is higher than the second reference ratio, the processor 120 may set focus based on the eye area 1104 of the subject.

In operation 1008, when it is determined that the size of the eye area of the subject does not satisfy the second reference value, the digital image processing device may detect an eyebrow area of the subject. For example, when the size of the eye area 1104 shown in FIG. 11 is smaller than the second reference size, the processor 120 may detect an eyebrow area 1106 of the subject. In another example, when the ratio between the size of the face area 1104 shown in FIG. 11 and the size of the eye area 1104 is lower than the second reference ratio, the processor 120 may detect the eyebrow area 1106 of the subject.

In operation 1010, the digital image processing device may magnify the eye area of the subject to include the eyebrow area of the subject. For example, the processor 120 may magnify the eye area 1104 of the subject such that the eye area 1104 of the subject shown in FIG. 11 includes the eyebrow area of the subject.

In operation 1012, the digital image processing device may set focus based on the eye area of the subject. For example, the processor 120 may set focus based on the eye area 1108 of the subject which is magnified to include the eyebrow area 1106 of the subject as shown in FIG. 11.

Figure 12:
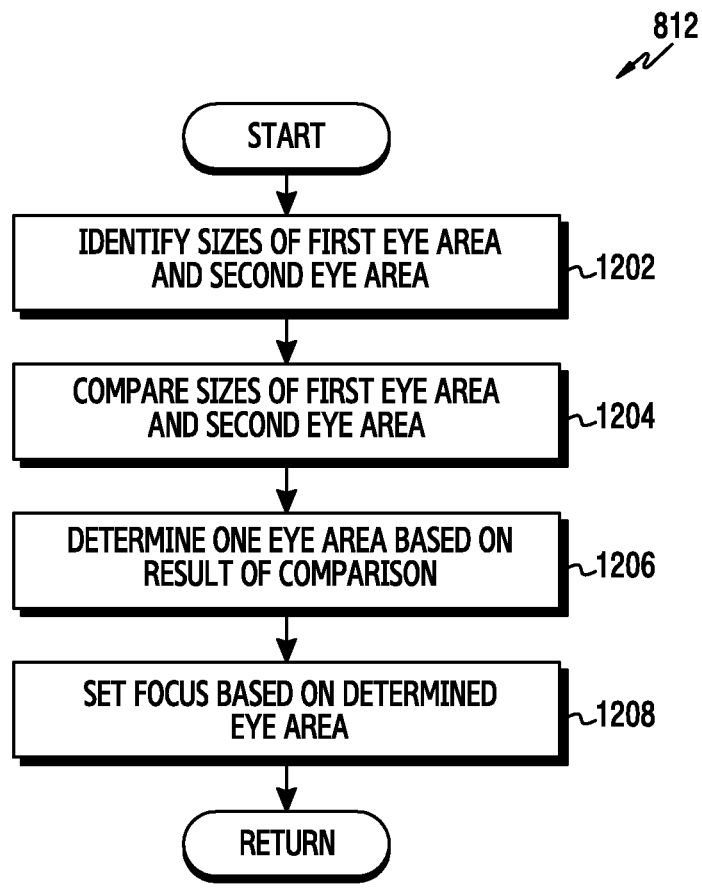
FIG. 12 is a flowchart that illustrates a method of setting focus on an eye area in a digital image processing device according to various embodiments of the present disclosure.

FIG. 12 is a flowchart that illustrates a method of setting focus on an eye area in a digital image processing device according to various embodiments of the present disclosure. The operation of setting focus based on an eye area, for example, in operation 812 of FIG. 8, will be further described below with reference to screen configurations shown in FIGS. 13A and 13B.

Figure 13A:
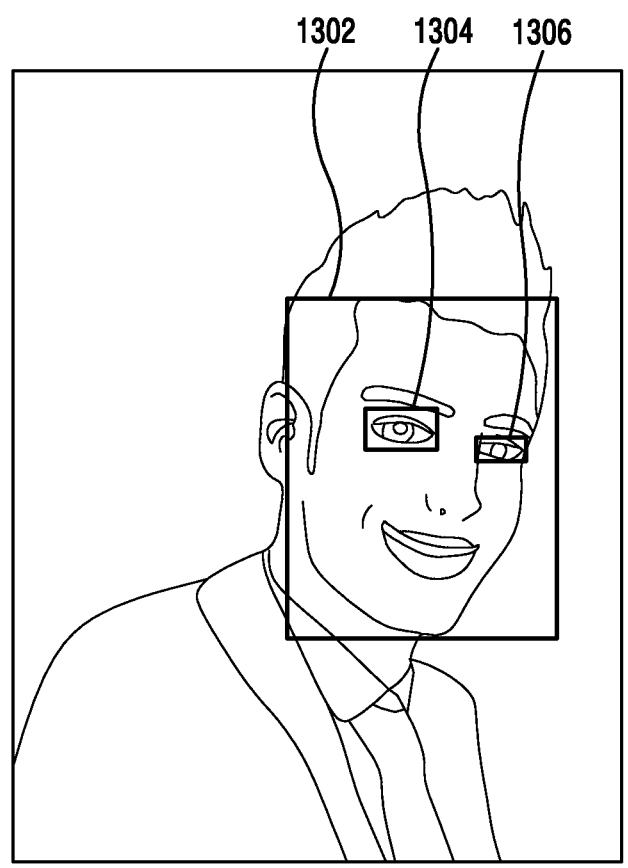
FIGS. 13A and 13B illustrate screen configurations for setting focus on an eye area in a digital image processing device according to various embodiments of the present disclosure.

Referring to FIG. 12, in operation 1202, the digital image processing device (for example, the digital image processing device 101 or 201) may identify sizes of a first eye area and a second eye area in a face area of a subject. For example, the processor 120 may identify a size of a right eye area 1304 and a size of a left eye area 1306 in a face area 1302 of a subject as shown in FIG. 13A.

In operation 1204, the digital image processing device may compare the size of the first eye area and the size of the second eye area. For example, the processor 120 may compare the size of the right eye area 1304 of the subject and the size of the left eye area 1306 of the subject as show in FIG. 13A.

In operation 1206, the digital image processing device may determine a certain eye area based on a result of the comparing of the sizes of the first eye area and the second eye area. For example, the processor 120 may determine the right eye area 1304 that has a large size from among the right eye area 1304 of the subject and the left eye area 1306 of the subject shown in FIG. 13A, as an eye area for setting focus. In another example, the processor 120 may determine the left eye area 1306 that has a small size from among the right eye area 1304 of the subject and the left eye area 1306 of the subject shown in FIG. 13A, as an eye area for setting focus.

In operation 1208, the digital image processing device may set focus based on the eye area which is determined in operation 1206. For example, the processor 120 may set focus based on the right eye area 1304 which has the large size from among the right eye area 1304 and the left eye area 1306 of the subject shown in FIG. 13A. In another example, the processor 120 may set focus based on the left eye area 1306 which has the small size from among the right eye area 1304 and the left eye area 1306 of the subject shown in FIG. 13A.

Figure 13B:
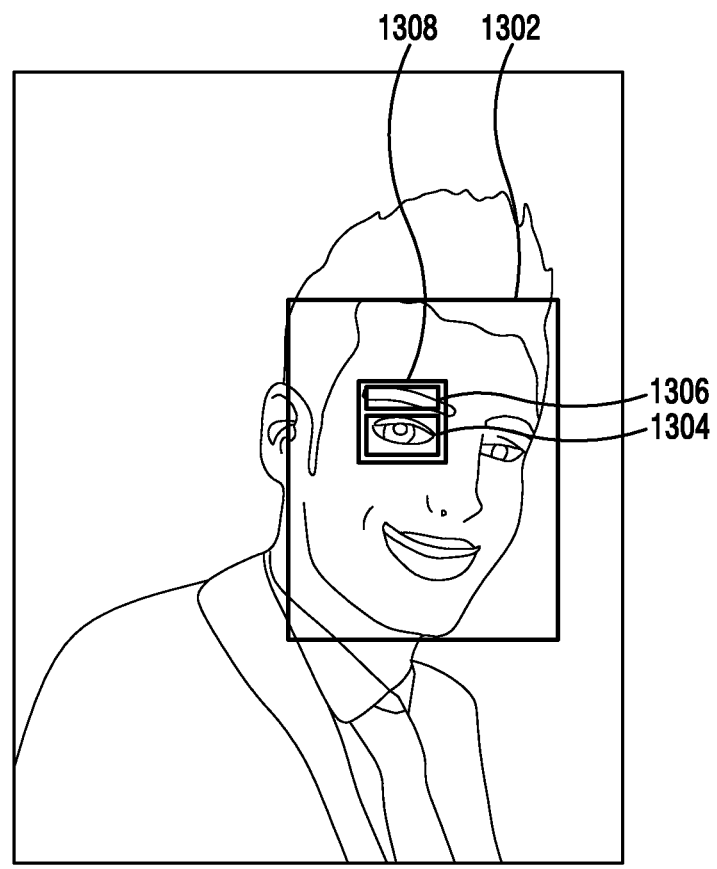

According to various embodiments of the present disclosure, when the size of the eye area determined based on the result of the comparing does not satisfy the second reference value, the digital image processing device may set focus based on an area of a predetermined size including an eyebrow area. For example, when the size of the eye area 1304 which is selected based on the result of the comparing of the sizes of the eye areas detected from the face area 1302 of the subject is smaller than the second reference size, the processor 120 may detect an eyebrow area 1306 as shown in FIG. 13B. The processor 120 may magnify the eye area of the subject to include the eyebrow area 1306 of the subject (1308). In another example, when a ratio between the size of the face area 1302 and the size of the eye area 1304 selected based on the result of the comparing is lower than the second reference ratio, the processor 120 may detect the eyebrow area of the subject. The processor 120 may magnify the eye area of the subject to include the eyebrow area 1306 of the subject.

Figure 14:
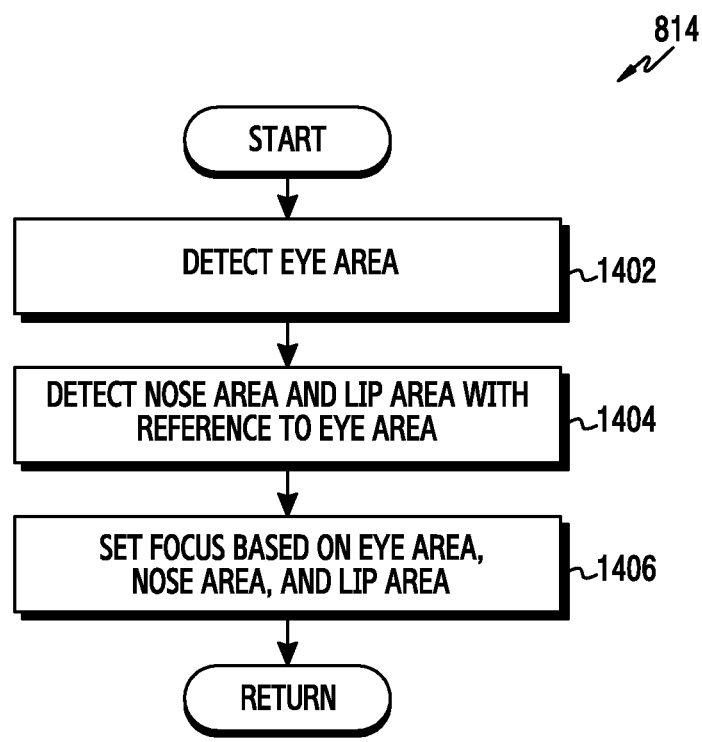
FIG. 14 is a flowchart that illustrates a method of setting focus on a face area in a digital image processing device according to various embodiments of the present disclosure.

FIG. 14 is a flowchart that illustrates a method of setting focus on a face area in a digital image processing device according to various embodiments of the present disclosure. The operation of setting focus based on a face area of a subject, for example, in operation 814 of FIG. 8, will be further described below.

Referring to FIG. 14, in operation 1402, the digital image processing device (for example, the digital image processing device 101 or 201) may detect an eye area of a subject. For example, the processor 120 may detect the eye area of the subject from the face area of the subject detected in operation 806 of FIG. 8. For example, the processor 120 may detect the eye area from the face area of the subject through the eye detection function. For example, the processor 120 may estimate the eye area from the face area of the subject through geometric modeling of the face.

In operation 1404, the digital image processing device may detect a nose area and a lip area with reference to the eye area of the subject. For example, the processor 120 may estimate the nose area and the lip area through the geometric modeling of the face with reference to the eye area of the subject detected from the face area of the subject.

In operation 1406, the digital image processing device may set focus based on the eye area, the nose area, and the lip area of the subject. For example, the processor 120 may set focus based on the eye area of the subject which is detected from the face area of the subject, and the nose area and the lip area of the subject which are estimated based on the eye area of the subject.

According to various embodiments of the present disclosure, the digital image processing device may detect the eye area, the nose area, and the lip area of the subject through respective detection functions. For example, when the face area of the subject is detected from the preview image through the face detection function, the processor 120 may detect the eye area, the nose area, and the lip area of the subject through the eye detection function, the nose detection function, and the lip detection function.

Figure 15:
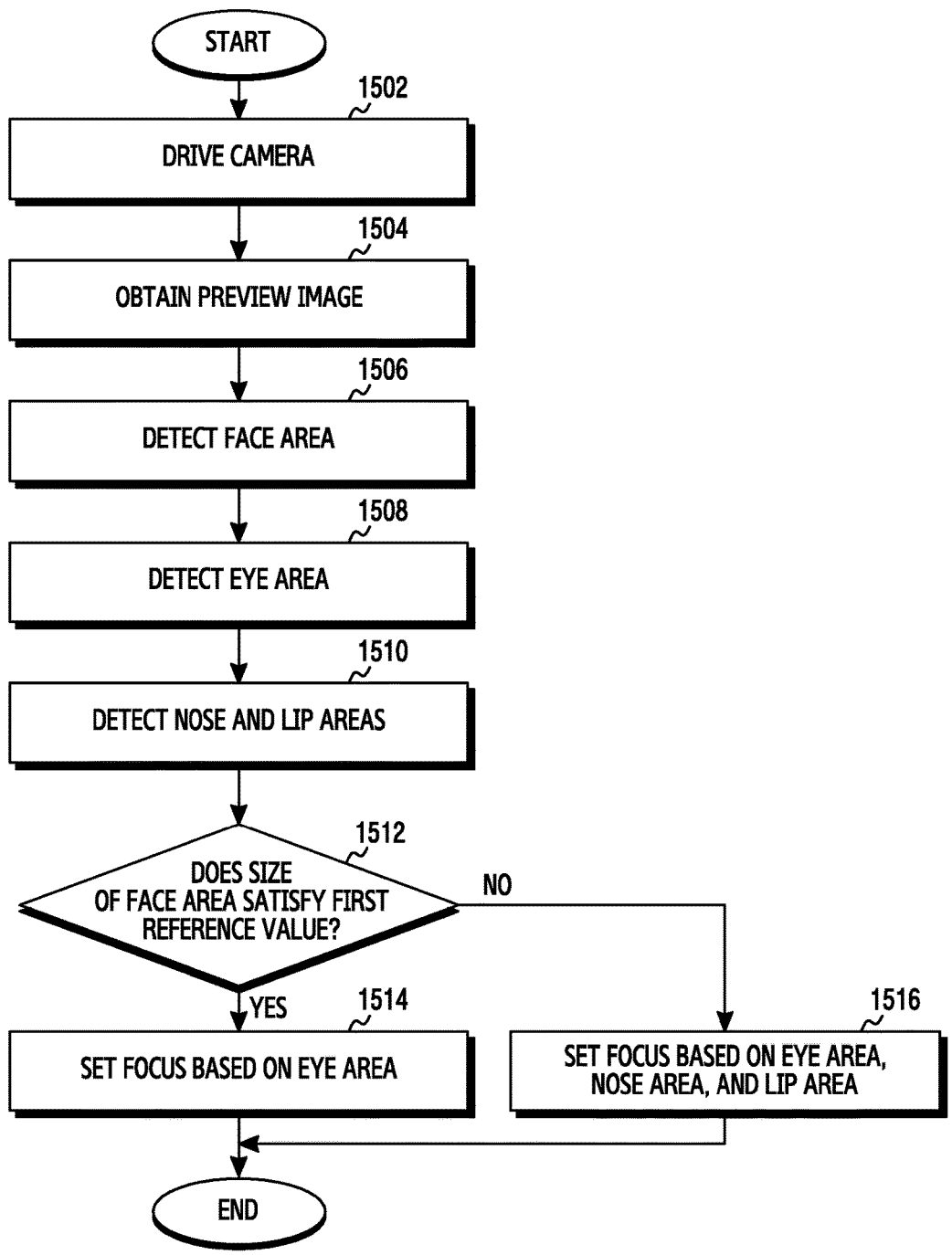
FIG. 15 is a flowchart that illustrates a method of auto focusing in a digital image processing device according to various embodiments of the present disclosure.

FIG. 15 is a flowchart that illustrates a method of auto focusing in a digital image processing device according to various embodiments of the present disclosure.

Referring to FIG. 15, in operation 1502, the digital image processing device (for example, the digital image processing device 101 or 201) may drive a camera (for example, the camera module 170 or 291). For example, when an input to activate the camera module 170 is detected through the input and output interface 150 or the display 160 (for example, the touch screen) in the same way as in operation 802, the processor 120 may control the camera module 170 to be activated.

In operation 1504, the digital image processing device may obtain a preview image through the camera. For example, the processor 120 may control to obtain the preview image through the camera module 170 in the same was as in operation 804 of FIG. 8. For example, the processor 120 may control to display the preview image obtained through the camera module 170 on the display 160.

In operation 1506, the digital processing device may detect a face area of a subject from the preview image. For example, the processor 120 may detect the face area of the subject from the preview image through the face detection function in the same way as in operation 806 of FIG. 8. For example, when a plurality of face areas are detected, the processor 120 may set a face area of the subject which is located nearest to the center of the preview image as a main face area. For example, when the plurality of face areas are detected, the processor 120 may set the largest face area as the main face area.

In operation 1508, the digital image processing device may detect an eye area of the subject from the face area of the subject. For example, the processor 120 may detect the eye area of the subject from the face area of the subject through the eye area detection function. In another example, the processor 120 may estimate the eye area of the subject from the face area of the subject through geometric modeling of the face. In another example, the processor 120 may detect the eye area of the subject by performing the eye area detection function with respect to the eye area estimated through the geometric modeling of the face.

In operation 1510, the digital image processing device may detect a nose area and a lip area based on the eye area of the subject. For example, the processor 120 may estimate the nose area and the lip area through the geometric modeling of the face with reference to the location of the eye area of the subject in the face area of the subject. In another example, the processor 120 may detect the nose area and the lip area of the subject through the nose area detection function and the lip area detection function.

In operation 1512, the digital image processing device may determine whether the size of the face area of the subject satisfies a reference value or not. For example, the processor 120 may determine whether the size of the face area of the subject is larger than a first reference size or not in the same way as in operation 808 of FIG. 8. In another example, the processor 120 may determine whether a ratio between the size of the preview image and the size of the face area of the subject is higher than a first reference ratio.

In operation 1514, when it is determined that the size of the face area of the subject satisfies the first reference value, the digital image processing device may set focus based on the eye area of the subject. For example, the processor 120 may set focus based on the eye area of the subject which is detected from the face area of the subject through an eye detector in the same way as in operation 812 of FIG. 8. In another example, the processor 120 may set focus based on the eye area of the subject which is estimated from the face area of the subject through geometric modeling of the face in the same way as in operation 812 of FIG. 8.

In operation 1516, the digital image processing device may set focus based on the eye area, the nose area, and the lip area. For example, the processor 120 may set focus based on the eye area of the subject which is detected from the face area of the subject through the eye detector, and the nose area and the lip area of the subject which are estimated based on the eye area of the subject. In another example, the processor 120 may set focus based on the eye area, the nose area, and the lip area of the subject which are detected from the face area of the subject through respective detection functions.

According to various embodiments of the present disclosure, operation 1508 of detecting the eye area of the subject and operation 1510 of detecting the nose area and the lip area may be performed after operation 1512 of determining whether the size of the face area of the subject satisfies the first reference value or not. For example, when it is determined that the face area satisfies the first reference value, the processor 120 may detect the eye area of the subject. When it is determined that the face area of the subject does not satisfy the first reference value, the processor 120 may detect the eye area, the nose area, and the lip area.

According to various embodiments of the present disclosure, operation 1510 of detecting the nose area and the lip area of the subject may be performed after it is determined that the size of the face area does not satisfy the first reference value in operation 1512. For example, when it is determined that the size of the face area of the subject does not satisfy the first reference value after the face area of the subject and the eye area of the subject are detected, the processor 120 may detect the nose area and the lip area of the subject. For example, the processor 120 may estimate the nose area and the lip area of the subject from the face area of the subject through geometric modeling of the face based on the eye area of the subject. The processor 120 may detect the nose area and the lip area from the face area of the subject through the nose area detection function and the lip area detection function.

The digital image processing device and the operation method thereof according to various embodiments of the present disclosure determine a focus area for setting focus based on size information of a face, so that the accuracy of focus set through the auto focusing function can be enhanced.

The term "module" used to describe the various embodiments of the present disclosure refers to a unit including one of hardware, software, and firmware, or a combination of two or more of them, for example. For example, the "module" may be used interchangeably with terms "unit," "logic," "logical block," "component" or "circuit." The "module" may be a minimum unit of an integrally configured component or a part of it. The "module" may be a minimum unit that performs one or more functions or a part of it. The "module" may be implemented mechanically or electronically. For example, the "module" may include at least one of an Application-Specific Integrated Circuit (ASIC) chip, Field-Programmable Gate Arrays (FPGAs), and a programmable logic device, which perform any operation that is already well known or will be developed in the future.

At least part of the apparatus (for example: modules or functions thereof) or method (for example: operations), according to various embodiments of the present disclosure may be implemented by using instructions stored in computer-readable storage media in the form of a program module. When the instructions are executed by a processor (for example: the processor 120), the one or more processors may perform a function corresponding to the instructions. The computer-readable storage media may be the memory 130, for example.

Examples of the computer-readable recording media include hard disks, floppy disks and magnetic media (for example, magnetic tapes), optical media (for example, a Compact Disc Read Only Memory (CD-ROM) and a Digital Versatile Disc (DVD), magneto-optical media (for example, floptical disks)), and hardware devices (for example, a Read Only Memory (ROM), a Random Access Memory (RAM) and a flash memory). Examples of the program commands include machine language codes created by a compiler, and high-level language codes that can be executed by a computer by using an interpreter. The above-described hardware devices may be configured to operate as one or more software modules for performing operations of various embodiments of the present disclosure, and vice versa.

A module or program module according to various embodiments of the present disclosure may include one or more of the above-described elements, may omit some elements, or may further include additional elements. The operations performed by the module, the program module, or the other elements according to various embodiments of the present disclosure may be performed serially, in parallel, repeatedly, or heuristically. In addition, some operations may be performed in different order or may be omitted, and an additional operation may be added. The various embodiments disclosed in the present specification and drawings are merely suggested to easily explain the technical features and assist easy understanding, and are not intended to limit the technical scope disclosed in the various embodiments of the present disclosure. Therefore, the scope of the various embodiments of the present disclosure should be interpreted as including all changes or various other embodiments derived based on the technical idea of the various embodiments of the present disclosure.

Although the present disclosure has been described with various exemplary embodiments, various changes and modifications may be suggested to one skilled in the art. It is intended that the present disclosure encompass such changes and modifications as fall within the scope of the appended claims.

What is claimed is:

1. A digital image processing device comprising:
a camera; and
a processor configured to:
  detect a face area in a preview image obtained by the camera,
  obtain a size of the face area,
  determine a focus area based on the size of the face area, and
  set focus based on the focus area,
wherein the processor is further configured to:
  determine an eye area of the face area as the focus area in response to the size of the face area satisfying a first reference value,
  determine whether the eye area satisfies a second reference value,
  in response to the eye area not satisfying the second reference value, increase the eye area to comprise eyebrows of a subject from the preview image, and
  determine the increased eye area as the focus area.

2. The digital image processing device of claim 1, wherein, the processor is further configured to select one of a plurality of face areas in response to detecting the plurality of face areas in the preview image.

3. The digital image processing device of claim 2, wherein the processor is configured to select the one of the plurality of face areas based on at least one of proximity information of each of the plurality of face areas to a center of the preview image or size information of each of the plurality of face areas.

4. The digital image processing device of claim 1, wherein, in response to one of the size of the face area being larger than a first reference size or a ratio between the size of the preview image and the size of the face area is higher than a first reference ratio, the processor is configured to determine that the size of the face area satisfies the first reference value.

5. The digital image processing device of claim 1, wherein, in response to a first eye area and a second eye area having different sizes being detected from the preview image, the processor is configured to determine at least one of the first eye area or the second eye area as the focus area based on respective sizes of the first eye area and the second eye area.

6. The digital image processing device of claim 1, wherein, in response to the size of the face area not satisfying the first reference value, the processor is configured to determine the face area as the focus area.

7. The digital image processing device of claim 1, wherein, in response to the size of the face area not satisfying the first reference value, the processor is configured to:
  determine an eye area, a nose area, and a lip area included in the preview image; and
  determine a combination of the eye area, the nose area, and the lip area as the focus area.

8. A method for processing a digital image, the method comprising:
  obtaining a preview image using a camera;
  detecting a face area in the preview image;
  obtaining a size of the face area from the preview image;
  determining a focus area based on the size of the face area; and
  setting focus based on the focus area,
wherein the determining the focus area based on the size of the face area comprises:
  in response to the size of the face area satisfying a first reference value, determining an eye area of the face area as the focus area;
  determining whether the eye area satisfies a second reference value;
  in response to the eye area not satisfying the second reference value, increasing the eye area to comprise eyebrows of a subject from the preview image; and
  determining the increased eye area as the focus area.

9. The method of claim 8, further comprising, in response to the detecting a plurality of face area in the preview image, selecting one of the plurality of face areas.

10. The method of claim 9, wherein the determining the focus area based on the size of the selected face area comprises estimating the size of the selected face area using geometric modeling of the selected face area.

11. The method of claim 9, wherein the selecting the one of the plurality of face areas comprises selecting the one of the plurality of face areas based on at least one of proximity information of each of the plurality of face areas to a center of the preview image or size information of each of the plurality of face areas.

12. The method of claim 8, wherein the determining the eye area included in the preview image as the focus area comprises:
in response to the size of the face area not satisfying the first reference value, increasing the eye area to comprise an estimated nose area and estimated lip area obtained through a geometric modeling of the face with reference to the eye area of the subject through the preview image; and
determining the increased eye area as the focus area.

13. The method of claim 8, wherein the determining the focus area based on the size of the face area comprises, in response to one of the size of the face area being larger than a first reference size or a ratio between the size of the preview image and the size of the face area is higher than a first reference ratio, determining that the size of the face area satisfies the first reference value.

14. The method of claim 8, wherein the determining the eye area included in the preview image as the focus area comprises:
in response to a first eye area and a second eye area having different sizes being detected from the preview image; and
determining at least one of the first eye area and the second eye area as the focus area based on respective sizes of the first eye area and the second eye area.

15. The method of claim 8, wherein the determining the focus area based on the size of the face area comprises, in response to the size of the face area not satisfying the first reference value, determining the face area as the focus area.

16. The method of claim 8, wherein the determining the focus area based on the size of the face area comprises:
in response to the size of the face area not satisfying the first reference value, determining an eye area, a nose area, and a lip area included in the preview image; and
determining a combination of the eye area, the nose area, and the lip area as the focus area.

* * * * *